(12) United States Patent
Schlarb et al.

(10) Patent No.: US 8,621,353 B2
(45) Date of Patent: *Dec. 31, 2013

(54) METHOD AND SYSTEM FOR IDENTIFICATION OF PAY-PER-VIEW PROGRAMMING

(76) Inventors: John M. Schlarb, Alpharetta, GA (US); Charlotte L. Barge, Stone Mountain, GA (US); Robert O. Banker, Cumming, GA (US)

( * ) Notice: Subject to any disclaimer, the term of this patent is extended or adjusted under 35 U.S.C. 154(b) by 2394 days.

This patent is subject to a terminal disclaimer.

(21) Appl. No.: 10/683,138

(22) Filed: Oct. 10, 2003

(65) Prior Publication Data

US 2004/0078823 A1 Apr. 22, 2004

Related U.S. Application Data

(63) Continuation of application No. 09/502,067, filed on Feb. 10, 2000, now Pat. No. 6,664,984.

(60) Provisional application No. 60/138,757, filed on Jun. 11, 1999, provisional application No. 60/170,302, filed on Dec. 13, 1999.

(51) Int. Cl.
 *G06F 3/00* (2006.01)

(52) U.S. Cl.
 USPC ........... 715/721; 715/700; 715/722; 715/723; 715/724; 715/725; 715/726

(58) Field of Classification Search
 USPC .......................................... 715/700, 717–726
 See application file for complete search history.

(56) References Cited

U.S. PATENT DOCUMENTS

| | | | | |
|---|---|---|---|---|
| 5,604,528 A | * | 2/1997 | Edwards et al. | 725/25 |
| 5,696,906 A | * | 12/1997 | Peters et al. | 705/34 |
| 5,850,218 A | | 12/1998 | LaJoie et al. | 345/327 |
| 6,034,677 A | * | 3/2000 | Noguchi et al. | 715/719 |
| 6,100,883 A | * | 8/2000 | Hoarty | 715/721 |
| 2004/0261098 A1 | * | 12/2004 | Macrae et al. | 725/31 |
| 2005/0138657 A1 | * | 6/2005 | Leftwich | 725/45 |
| 2008/0216111 A1 | * | 9/2008 | Alten et al. | 725/28 |

FOREIGN PATENT DOCUMENTS

WO   WO 95/28799   10/1995

OTHER PUBLICATIONS

Perlman et al.; a working Anti-Taping System for Cable Pay-Per-View; Aug. 1998; IEEE; vol. 35; 6 pages.*

Almeroth et al.; An Alternative Paradigm for Scalable On-Demand Applications: Evaluating and Deploying the Interactive multimedia Jukebox; 1999; IEEE; vol. 11; p. 658-672.*

* cited by examiner

*Primary Examiner* — Linh K Pham
(74) *Attorney, Agent, or Firm* — Merchant & Gould

(57) ABSTRACT

A method and system for designating and identifying individual programming that is available in a subscriber television system as a pay-per-view event. The identified programming includes programs that are not normally available for viewing by some subscribers or for which a subscriber has not subscribed. The programming can include an individual program, groups of programs, and non-pay-per-view channels. The subscriber can then elect to view the programming as a pay-per-view event.

10 Claims, 2 Drawing Sheets

302

METHOD AND SYSTEM FOR IDENTIFICATION OF PAY-PER-VIEW PROGRAMMING

REFERENCE TO RELATED APPLICATIONS

The present application is a continuation of application Ser. No. 09/502,067, filed Feb. 10, 2000, now U.S. Pat. No. 6,664,984 which claims the benefit of U.S. Provisional Application No. 60/138,757, filed on Jun. 11, 1999, and U.S. Provisional Application No. 60/170,302, filed on Dec. 13, 1999.

FIELD OF THE INVENTION

This present invention relates to identifying pay-per-view programming in a subscriber television system, and more specifically to identifying specific individual programs or channels as pay-per-view programming within a program guide.

BACKGROUND OF THE INVENTION

Subscriber television systems transmit television signals to system subscribers. Subscriber television systems typically include a headend for receiving satellite signals, demodulating them to baseband signals, combining them with other television programming signals, and transmitting the combined signals via a transmission media to subscriber equipment that tunes to television channels for display to the subscriber. The combined signals can be transmitted to the subscriber over a variety of transmission media such as via satellite, coaxial cables, fiber optic cables, or combinations thereof. Signals to the subscriber can be provided directly to a cable-ready television, a cable-ready video cassette recorder (VCR), or a home communication terminal (HCT) connected to a television or other display device, such as a computer.

Many subscriber television systems can provide hundreds, or even thousands of channels, to subscribers. Often these subscriber television systems provide television program information (e.g., channel line-up, program schedules, etc.) to the subscriber equipment so that the subscriber can view the program information on the television itself. This program information is typically presented in the form of a program guide that displays the program information by time and channel.

The program guide typically displays all of the available channels and services on a subscriber television system. Subscribers can see what is available on all the channels even if they do not subscribe to all of the channels and services available on the subscriber television system.

A simple program guide can automatically scroll through the available television channels to present the program information, such as name and description, at a selected time. An interactive program guide (IPG) allows a subscriber some control over the presentation of program information. The subscriber, depending on the subscriber television system, can scroll up or down through the hundreds of channels and forwards or backwards through several days or weeks of program information. A subscriber often depends on the program guide to provide them with information on the available programming on the subscriber television system.

Pay-Per-View (PPV) programs, such as movies or sporting events, generate additional revenue for the system operators. A subscriber views the program guide for the PPV channel, selects an available PPV program, and communicates a desire to pay for viewing the PPV program to the system operator. These additional purchases provide the system operator with additional revenue beyond the normal monthly subscription charges. Current PPV programming is typically limited to a few channels of PPV-only programming. As the systems and methods of providing PPV services become more sophisticated, additional programs could be available as PPV programming and need to be easy for a subscriber to identify as PPV programming.

Thus, what is needed is a simple and easy method for a subscriber television system operator to select and designate programs as PPV programming and for subscribers to identify such programs as PPV programming.

DETAILED DESCRIPTION

The present invention is directed to a simple and easy method and system that allows a subscriber television system operator to select, and, for a system subscriber to identify, programs as pay-per-view programming. Included in the available PPV programming are programs or channels that would not normally be available to an individual subscriber for viewing. The method and system allows any individual program, group of programs, or channel to be designated as available for purchase as a pay-per-view event if so identified as PPV by the system operator. The availability of these additional pay-per-view events is intended to complement current PPV channels and provide additional revenue to a subscriber television system operator from the additional programming available as PPV programming.

The present invention contemplates a PPV system that allows individual programs on an otherwise non-PPV channel to be made available to a subscriber as pay-per view events although the subscriber does not subscribe to, and would not normally be allowed to view, that program. For example, the system operator of a subscriber television system may decide to allow the viewing, for a fee, of a movie showing on an otherwise non-PPV channel (e.g. HBO) to subscribers that did not subscribe to that channel. If the subscribers see an identification of the movie as being available as a PPV event in a program guide, they can follow the standard PPV process to purchase and view the movie. In addition, entire channels that are not typically considered PPV programming could be available as PPV events. For example, ESPN could be available as a PPV event to subscribers that did not, on a monthly basis, purchase a programming package that included ESPN. This allows the system operators to generate additional revenue from one-time special purchases of services that are currently not identified as PPV programs.

In an exemplary embodiment, the present invention provides a PPV identifier, such as a PPV icon, for identifying, within the program guide, PPV programs, and channels as available for purchase.

Figure 1:
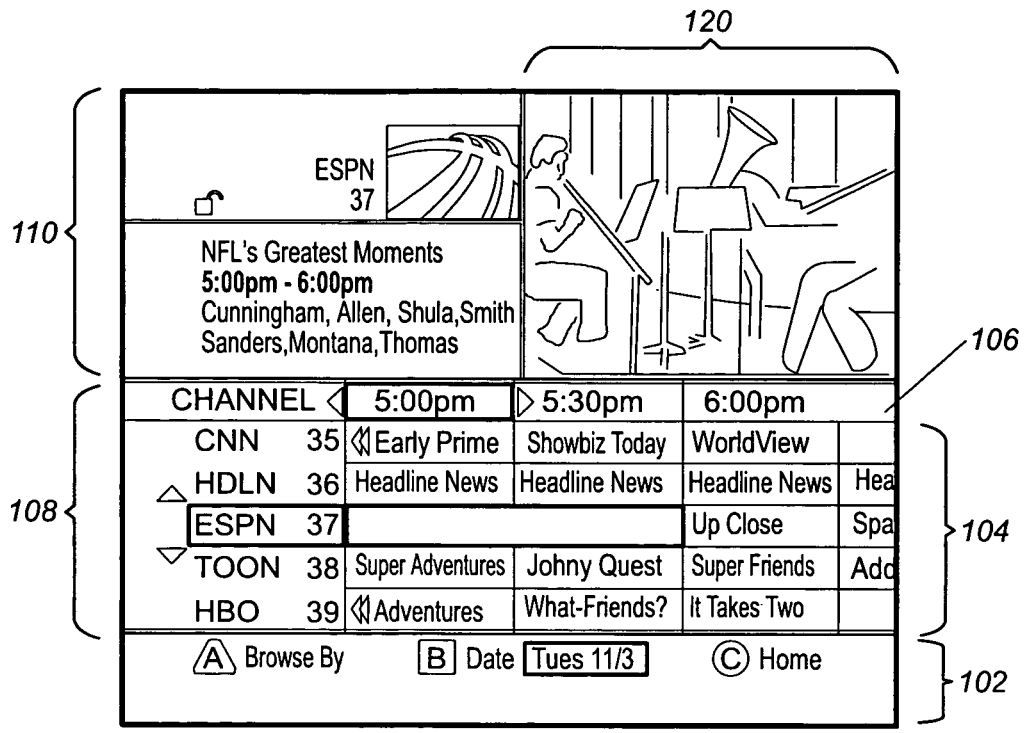
FIG. 1 illustrates a program guide for a subscriber television system.

Referring now to the drawings, in which like numerals represent like elements throughout the several figures, the present invention will be described. FIG. 1 provides an example of a subscriber television system program guide. Browse block 102 displays the date and other navigational information associated with the program guide. Program block 104 displays the individual programs associated with the displayed channel, time, and date. Time block 106 displays a time range associated with a time selection, such as that associated with entry into the program guide or associated with a user-selected time. The highlighted time, 5:00 PM, indicates the selected time. Channel Identification block 108 displays channels available in the system and associated service providers. Program Information block 110 displays program information associated with the program on the selected channel at the selected time. Picture block 120 displays a still picture, a video clip, live video, information associated with the selected program, or information associated with the program guide. A program guide has been described in general terms. There are a wide variety of other display formats for program guides and the present invention is not limited by the format or content of the program guide.

Figure 2:
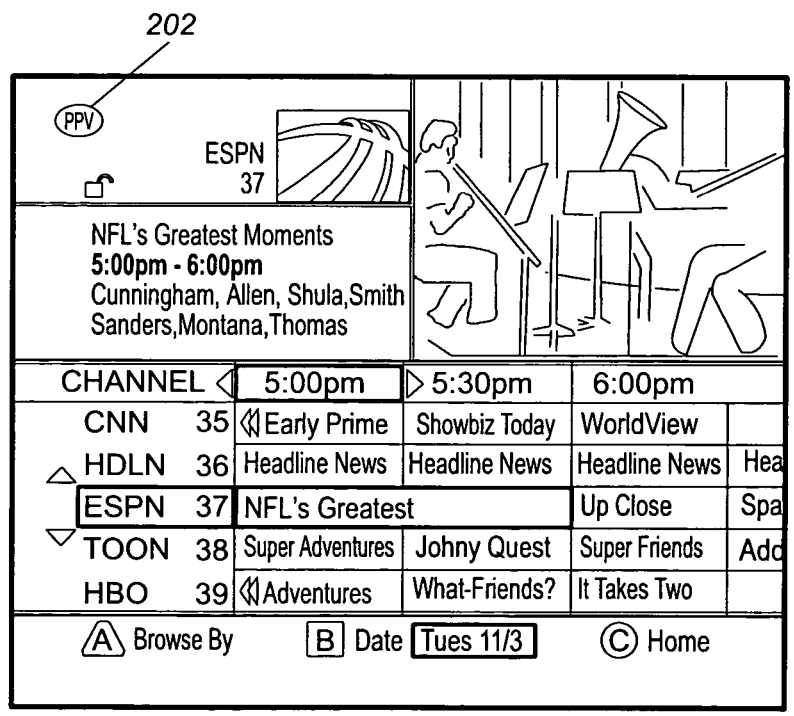
FIG. 2 illustrates a PPV icon displayed in a program information block for the purpose of identifying a program as being available for pay-per-view.

FIG. 2 illustrates a PPV icon 202 in the program information block 110, identifying the selected program as being available for pay-per-view. In this example, the 5:00 PM showing of NFL's Greatest Moments on ESPN, channel 37, is available for purchase as a PPV event as indicated by the icon 202. The icon 202 indicates to subscribers viewing the program guide that they could pay to view the NFL's Greatest Moments even if they do not normally have ESPN available to them for viewing. The icon 202 is displayed with the other information associated with the selected program, which is NFL's Greatest Moments.

Figure 3:
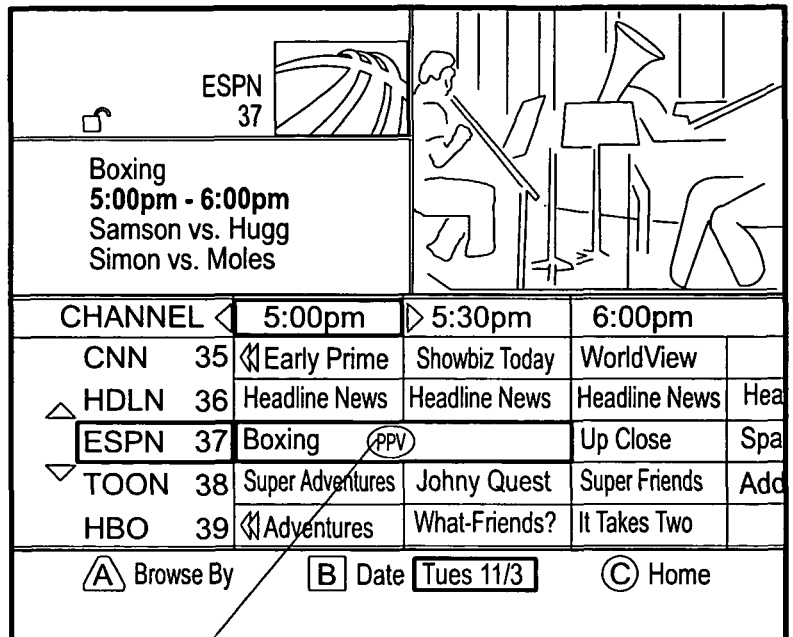
FIG. 3 illustrates a PPV icon displayed in a program block for the purpose of identifying a program as being available for pay-per-view.

FIG. 3 illustrates a PPV icon 302 in the program block 104, identifying a program as being available for pay-per-view. The 5:00 PM showing of Boxing on ESPN, channel 37, is available for purchase as a PPV event as indicated by the icon 302. The icon 302 indicates to subscribers viewing the program guide that they could pay to view Boxing even if they do not subscribe to ESPN. The display of a PPV icon 302 in the program block 104 would provide PPV identification in program guides that does not display program information or have a program information block 110.

Figure 4:
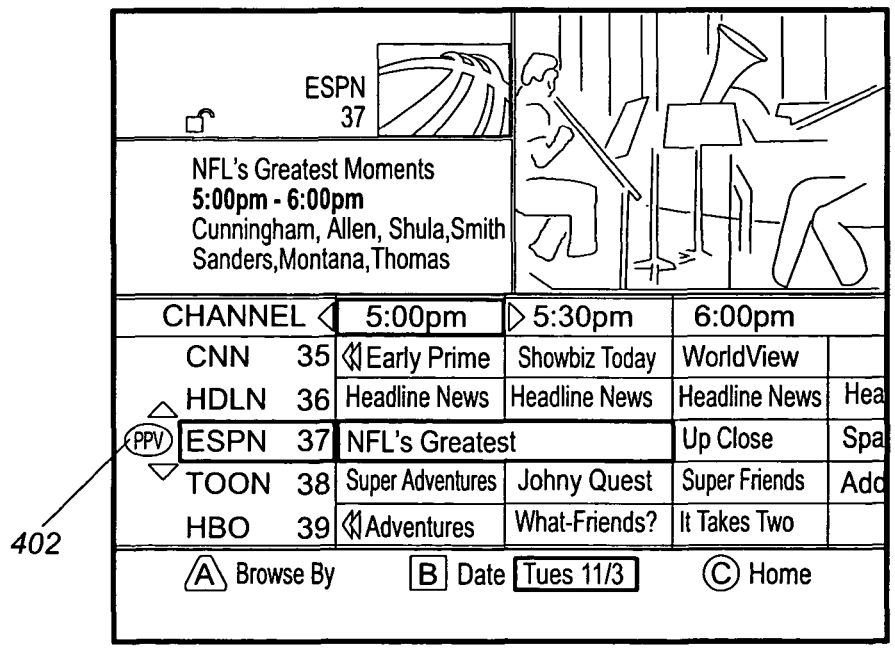
FIG. 4 illustrates a PPV icon displayed in a channel identification block for the purpose of identifying a channel as being available for pay-per-view.

FIG. 4 illustrates a PPV icon 402 in the channel identification block 108, identifying a channel as being available for pay-per-view. A PPV icon 402 indicates that all programming on ESPN is available for purchase as a PPV event. The icon 402 indicates to subscribers viewing the program guide that they could pay to view the ESPN channel.

The designation of an individual program, a group of programs, or a channel as available for purchase as a pay-per-view event by a system operator in the programming information for the subscriber television system can identify for the subscribers the programs available for purchase. Subscribers can purchase a selected program from the program guide and a purchase window. In addition, subscribers could purchase several blocks of programming on a selected channel. Purchases can operate in conjunction with other subscriber television system control methods that allow subscriber access to programming on a PPV basis. This can be accomplished without requiring the programming to be listed in a separate PPV listing or requiring additional exclusive PPV channels. Subscribers can access programming without having to subscribe to an entire channel or service. System operators can charge a premium for the one time purchase of a program or service.

System operators can also use the present invention to allow subscribers to permanently subscribe to a service. The purchase of a service for the duration of a movie, or several movies, for a day, for a week, or for several months is all time period options available with the present invention. The system operator controls the options available to the subscriber.

An example of a pay-per-view system for use within a subscriber television system is provided in U.S. application Ser. No. 09/303,285, Schlarb et al., Method and Apparatus for Pay-Per-View System, filed Apr. 30, 1999, which is incorporated herein by reference. An overview of a two-way interactive subscriber television system is provided in U.S. patent application Ser. No. 09/126,921, entitled "Conditional Access System", which is incorporated herein by reference.

In an exemplary embodiment, the present invention uses an existing two-way interactive subscriber television system to allow a subscriber to subscribe to any program or channel at any time (so called "impulse" subscription). The operator can configure the programs offered for impulse subscription along with a service code and cost of the subscription for each program or channel. When a subscriber selects a program that has been configured as an impulse subscription program and the subscriber has not already subscribed to that program, the HCT will prompt the subscriber to purchase the program. If the subscriber presses the SELECT key, the HCT will prompt the subscriber for a purchase code. The same rules that govern PPV event purchases apply here such that if the code is disabled, the user will not be prompted to purchase the program. If the subscriber chooses to subscribe or purchase the program and the purchase code is valid, the HCT will relay that request upstream to a subscriber television system controller. The HCT will transmit upstream the required purchase information, such as the channel number, transport stream identification (TSID), or authorization information of the purchase request. Before authorizing the HCT, the system controller must ensure the HCT is allowed to exercise purchase functions by checking if purchase is enable on that HCT and if so, the system controller will authorize the HCT.

The system controller will generate the transactions to that HCT giving it authorization to view the program. The system controller must also track these purchases so that the data can be coordinated with a billing system. Authorization includes storing the purchase information including the timestamp of the request and then assigning an operator defined service code to the HCT and then generating an acknowledgement followed by the appropriate authorization transactions for viewing the purchased program. The service code assignment must be tracked until a service change comes from billing which includes the new service code. At that time, the subscription data will be purged. This is to account for the online refreshes and other HCT service changes that may come from the billing system between the time of the purchase and the time the billing system is updated with the purchase service change.

The system controller must provide support for defining PPV programs. This definition allows the system operators to individually select which programs are offered as PPV and allow them to specify a service code, channel description, and cost for each program. In an embodiment, the service code should be defined and could contain the single program or a tier of channels. The system controller can use an out-of-band (OOB) path in the subscriber television system. The system controller operator has the ability to generate reports on the purchase data and send it to the screen, printer, or a file. The operator also has the capability to generate the data to a file and upload the data from that file.

The present invention can be used within a program guide to easily identify any programming that a subscriber can pay to view. With the availability of an easy method and system for identifying PPV programming within a program guide, a system operator can designate any programming as PPV. This provides the system operator with an opportunity for increased revenue from the designation of additional programs as available for purchase or pay-per-view.

CONCLUSION

From the foregoing, it will be appreciated that the present invention provides a simple and easy method and system that allows a subscriber television system operator to select, and, for a system subscriber to identify, programs as pay-per-view programming. Included in the available PPV programming are programs or channels that would not normally be available to an individual subscriber for viewing.

The present invention has been described in relation to particular embodiments, which are intended in all respects to be illustrative rather than restrictive. For example, the PPV identifier in an exemplary use is a PPV icon, the PPV identifier could be any of a variety of display elements such as a PPV designated color or shading to indicate the program is available as a PPV event. Those skilled in the art will appreciate that although the present invention has been described in the context of program guide, the present invention would also identify PPV events within other program information related displays such as a browse banner.

It will be understood by those skilled in the art that the present invention is described in the context of a generic program guide, but that the present invention can be implemented in other program guides with different display formats and different location and content of elements.

In conclusion, while exemplary embodiments of the invention have been illustrated and described, it will be clear that the invention is not so limited. Alternative embodiments will be apparent to those skilled in the art to which the present invention pertains without departing from its spirit or scope. Accordingly the appended claims rather than the foregoing description define the scope of the present invention.

What is claimed is:

1. A method for providing programming to subscribers, comprising the steps of:
   providing a first subscription package to a first set of subscribers;
   providing a second subscription package to a second set of subscribers, the second subscription package comprising at least one channel that is not included in the first subscription package, the at least one channel consisting of programming that the second set of subscribers does not pay for on a per use basis and is not included in the channels normally available for view as part of the second subscription package; and
   designating a block of programming from the at least one channel as available for purchase by the first set of subscribers as a pay-per-view event without purchase of a subscription to said at least one channel, said block of programming comprising an individual program;
   wherein said designating is performed by a television system operator defining a service code for the designated block of programming.

2. The method of claim 1, wherein the block of programming comprises a group of programs.

3. The method of claim 1, wherein said block of programming comprises programming provided during a predetermined time period.

4. A subscriber television system for providing programming associated with services available on the subscriber television system, the system comprising:
   a headend for providing a first subscription package to a first set of subscribers and a second subscription package to a second set of subscribers, the second subscription package comprising at least one channel that is not included in the first subscription package, the at least one channel consisting of programming that the second set of subscribers does not pay for on a per use basis and is not included in the channels normally available for view as part of the second subscription package;
   the headend further providing a service code for the designated programming;
   a transmission medium for interfacing with the headend for transmission of the programming available on the subscriber television system; and
   a home communication terminal for interfacing with the transmission medium, the home communication terminal enabling a member of the first set of subscribers to purchase a block of programming from the at least one channel as a pay-per-view event without purchase of a subscription to said at least one channel, said block of programming comprising an individual program.

5. The system of claim 4, wherein the enabling by the home communication terminal includes providing a display of the block of programming on a television set.

6. The system of claim 4, wherein the block of programming comprises a group of programs.

7. The system of claim 4, wherein said block of programming comprises programming provided during a predetermined time period.

8. A system for providing programming to subscribers, comprising:
   means for providing a first subscription package to a first set of subscribers, and a second subscription package to a second set of subscribers, the second subscription package comprising at least one channel that is not included in the first subscription package, the at least one channel consisting of programming that the second set of subscribers does not pay for on a per use basis and is not included in the channels normally available for view as part of the second subscription package; and
   means for designating a block of programming from the at least one channel as available for purchase by the first set of subscribers as a pay-per-view event without purchase of a subscription to said at least one channel, said block of programming comprising an individual program, wherein the designated includes a service code defined by a television system operator.

9. The system of claim 8, wherein the block of programming comprises a group of programs.

10. The system of claim 8, wherein said block of programming comprises programming provided during a predetermined time period.

* * * * *